Figure 1:
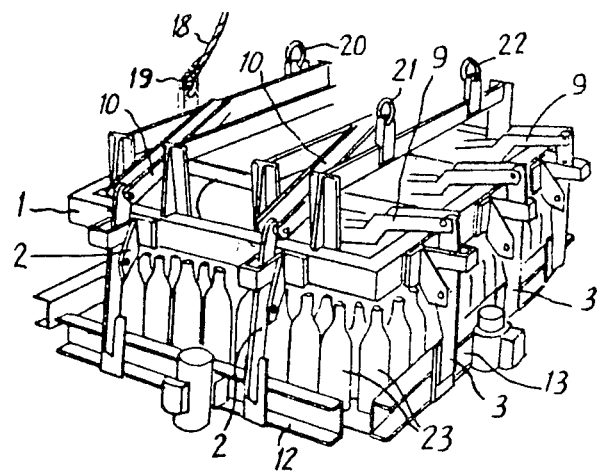

United States Patent [19]

Vasseur et al.

[11] Patent Number: 4,603,896
[45] Date of Patent: Aug. 5, 1986

[54] METHOD AND GRIPPING HEAD FOR GRIPPING A LAYER OF CONTAINERS ARRANGED ON A PLANE

[75] Inventors: Jackie Vasseur; Roger Vasseur, both of Dunkerque, France

[73] Assignee: S.A. Atecmi, Grand Synthe, France

[21] Appl. No.: 664,967

[22] Filed: Oct. 26, 1984

[30] Foreign Application Priority Data

Oct. 28, 1983 [FR] France ............................... 83 17506
Jul. 9, 1984 [FR] France ............................... 84 11258

[51] Int. Cl.$^4$ ........................... B66C 1/04; B66C 1/44
[52] U.S. Cl. ........................................ 294/2; 294/65.5; 294/87.1; 294/88; 294/119.1; 414/36; 414/59
[58] Field of Search ................. 294/2, 67.3–67.33, 294/86.4, 87.1, 87.22–87.26, 88, 103.1, 106, 113, 119.1; 56/328 TS; 221/200, 202; 366/108; 414/36, 59, 71, 415, 606

[56] References Cited

U.S. PATENT DOCUMENTS

| | | | |
|---|---|---|---|
| 3,460,329 | 8/1969 | Overstreet | 56/328 TS |
| 3,548,578 | 12/1970 | Shipley | 56/328 TS |
| 3,583,752 | 6/1971 | Panissidi | 294/88 |
| 4,252,358 | 2/1981 | Klebs | 294/119.1 X |
| 4,252,496 | 2/1981 | Williams | 294/113 X |
| 4,493,599 | 1/1985 | Hartness et al. | 294/87.1 X |

FOREIGN PATENT DOCUMENTS 753772 8/1980 U.S.S.R. ................................... 294/2

Primary Examiner—Johnny D. Cherry
Attorney, Agent, or Firm—Kerkam, Stowell, Kondracki & Clarke

[57] ABSTRACT

The invention provides a process for gripping a layer of standing containers (23) such as bottles, and a head for gripping a whole layer of such containers. The process is characterized in that the layer of containers (23) is framed by four simultaneously actuated jaws (12 to 15), the jaws being movably positioned to nip or bear against the outer container of the layer while subjecting the jaws to vibrations, thereby causing the containers to align themselves in rows, bearing against each other. The rows are offset from each other in a longitudinal direction by a direction such that the containers are disposed in a staggered or quincunx arrangement. The rows of containers are acted upon in the direction in which they bear against each other with a nipping force ($F_1$, $F_2$). The nipping force ($F_1$, $F_2$) may be greater than the force ($f_1$, $f_2$) with which the containers are acted upon in the direction in which they bear against each other in their row.

16 Claims, 6 Drawing Figures

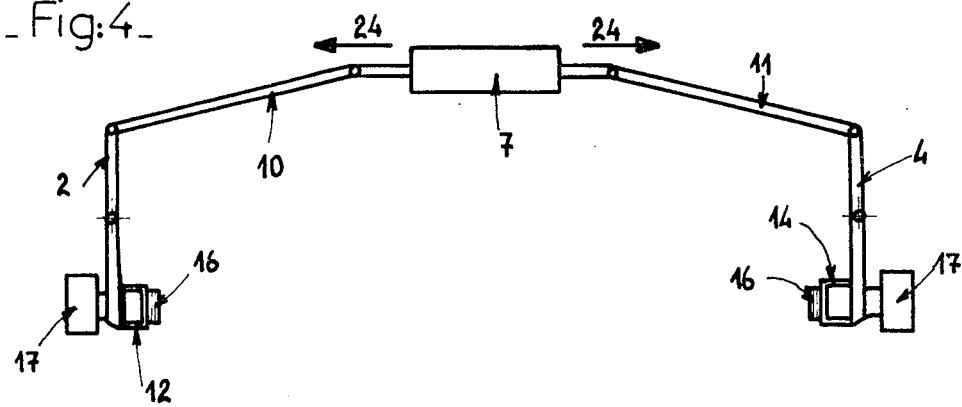
_Fig:4_
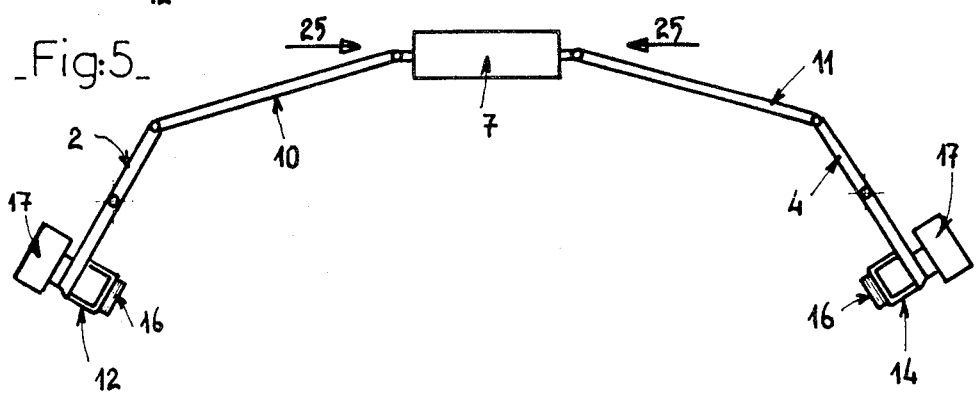
_Fig:5_
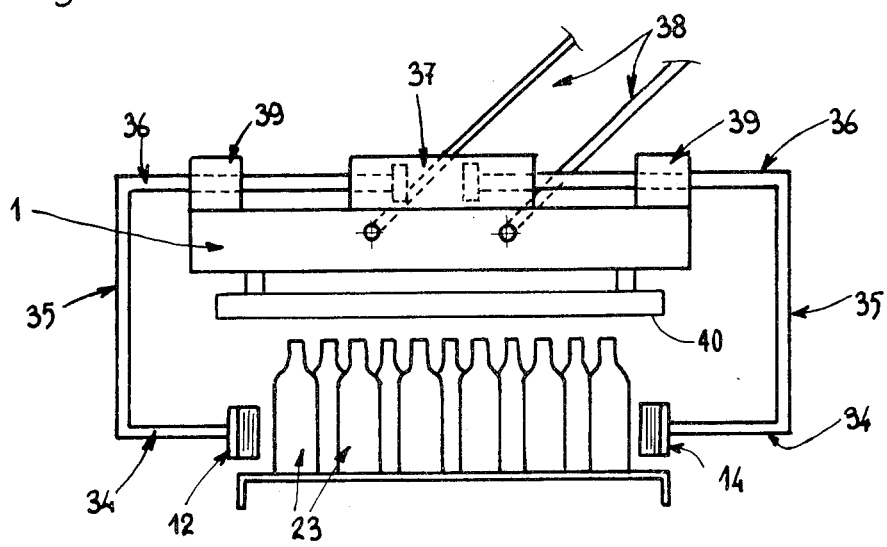
_Fig:6_

METHOD AND GRIPPING HEAD FOR GRIPPING A LAYER OF CONTAINERS ARRANGED ON A PLANE

The invention relates to a process for gripping a layer of containers, such as bottles, and to the heads for gripping a whole layer of such containers lined up so as to occupy on their support plane a rectangular area corresponding generally to that of the support plane of a handling pallet.

On these pallets, the bottles are generally stored upright, in layers which, after interpositioning of a tray, for example made from cardboard, are superimposed, the whole of the layers being then held in position by wrapping for example with a retractable film.

In one of the longitudinal and transverse directions of each layer, the bottles are aligned and leaning against each other so as to form rows of bottles and these rows are offset longitudinally with respect to each other by a distance such that in the other direction of the layer, the bottles are disposed in a staggered or quincunx arrangement.

For gripping the bottles with a special head, after shrinkage of the wrapping covering the whole of the layers and of the possible tray covering the upper layer, several processes are known up to date. All are related to the necks of the bottles.

In one of these processes, between supports contiguous with the external generatrices of the necks of the endmost rows of bottles and these endmost rows, but also between all the rows of bottle necks, inflatable pads are disposed, generally called "actuators", such as those sold under the trademark "PRONAIR", which actuators are associated with a frame for joint handling thereof, then these actuators are filled with a pressurized fluid so that their lateral faces which may advantageously have at least one longitudinal rib, energetically nip all the necks of the layer of bottles.

In a variant of this process, instead of the actuators of the above mentioned type, stringers are disposed at the same positions forming nipping jaws which are also associated with a frame for joint handling thereof and which are then controlled, for example by means of actuators, so that each of them grips a whole row of bottle necks.

In another process, each bottle is also gripped with one of the means, such as suction cups, carried by the frame for joint handling thereof.

Besides their complexity, the gripping heads designed for implementing these processes have the disadvantage that each one is only directly suitable for gripping the layers of bottles which, from one layer to another, always have the same diameter.

In fact, the numbers and between axes distances of the rows and of the bottles of each row vary depending on the diameter of the bottles and the head must be adapted for these numbers and between axes distances.

Depending on the diameters of the bottles, it is then necessary either to have special heads, or to waste the time required for indispensable adjustments.

Furthermore, if the containers gripped do not have necks, such as jars, these heads become totally unusable.

Furthermore, it must be emphasized that the processers existing at the present time are ill adapted to gripping layers of containers or bottles, in which layers some of the containers have a section slightly less than or slightly greater than that of the other containers.

A result which the invention aims at obtaining is a gripping process which grips a whole layer of containers and which holds all the containers perfectly in place, including those which might have a smaller section than that of the other containers.

Another result which the invention aims at obtaining is the construction of a gripping head which is simple and of a relatively low cost price.

For this, the invention provides a gripping process more especially characterized in that at the level of the body of the containers, the layer of containers is surrounded on its four sides by four jaws acting on said bodies, the jaws are actuated substantially simultaneously so as to nip the layer of containers and each jaw is subjected to vibrations whose action is combined with that of the nipping.

According to another characteristic of the process, by means of two opposite jaws, a greater nipping force is exerted on the layer than that exerted by the other two jaws.

The gripping head for implementing the process is characterized by the fact that it comprises four mobile jaws actuated by cylinder and piston devices which form a frame which surrounds the layer of containers at the level of their bodies, and vibrators carried respectively by each of the jaws.

Figure 2:
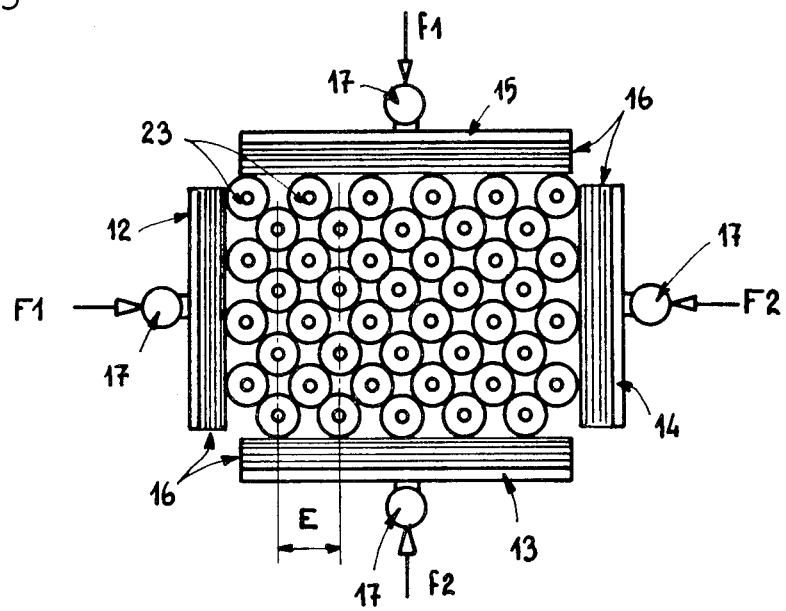
Figure 3:
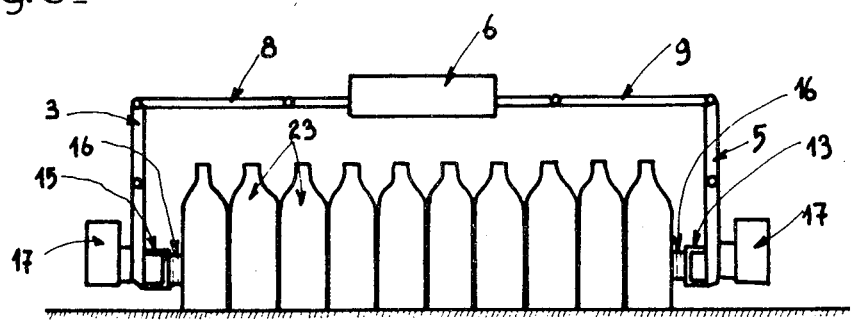

The invention will be better understood with reference to the following description given by way of non limitative example with reference to the accompanying drawings which show schematically:

FIG. 1: a perspective view of the whole of the machine;

FIG. 2: a top view of a layer of recipients gripped by the jaws;

FIG. 3: an elevational view of the clamping device of the first pair of jaws;

FIG. 4: a view of the clamping device of the second pair of jaws in the position where the jaws are clamped;

FIG. 5: a view similar to that of FIG. 3 but in the position where the jaws are unclamped; and FIG. 6: a variant of the gripping head.

The gripping head of the invention is formed essentially by a rectangular frame 1 on which are hinged four pairs of push-rods 2, 3, 4, 5 actuated by piston and cylinder devices 6, 7 to which they are connected by links 8, 9, 10, 11.

The push-rods 2, 3, 4, 5 end in jaws 12, 13, 14, 15 which have resilient linings 16 and which have the essential feature of each comprising a vibrator 17.

Preferably, the vibrators 17 are fixed directly on each jaw 12 to 15 and the linings are relatively thin so as not to filter the vibrations.

The whole may be raised by slings 18 which are passed through rings 19, 20, 21, 22 secured to the frame 1.

Of course, any other lifting means is suitable as for example a pantograph.

Obviously, there is a compressed air supply which actuates the piston and cylinder devices such as 6 and 7 and an electric power supply which actuates the vibrators 17.

The devices are widely known and do not form part of the invention.

With the packs such as bottles 23 disposed in layers having a rectangular or square support plane, the gripping head is positioned above with the jaws 12, 14 spaced apart, such as they are shown in FIG. 5.

The gripping head is lowered to the desired level, that is to say that the linings 16 are facing the bodies of bottles 23 and not the neck thereof, then the jaws are clamped, by controlling the piston and cylinder devices such as 6, 7, so that the rods of these piston and cylinder devices move in the direction of arrows 24.

The result is that push-rods 2 and 4 as well as 3 and 5 pivot so as to clamp the packs by nipping.

An essential feature of the invention resides in the simultaneous actuation of the vibrators 17 during clamping.

During the operation of the vibrators, the packs such as bottles 23 take up a correct position and squeeze up suitably against each other so that the whole can be lifted without the risk of certain containers remaining on the ground.

According to another feature of the process of the invention, the pairs of jaws 12–14, 13–15 exert a different pressure on the four sides of the layer of containers.

Thus, jaws 12, 14 may act in the direction in which the rows bear against one another with a force $F_1$, $F_2$ greater than the forces $f_1$, $f_2$ with which jaws 13, 15 act in the direction in which the containers bear against each other inside their row.

Of course, an opposite arrangement may be suitable, the important thing being to differentiate the nipping force exerted by each pair of jaws.

Because of the differentiated pressure depending on the direction and because of the vibrations, in the case where there are containers of smaller section, the containers in the same row may move slightly away from each other so that the interaxes distance E of the rows may be reduced until all the containers are in bearing relation.

In the direction in which the containers in the same row bear against each other, the pressure is for example just enough to hold the layer in position.

According to a feature of the invention, the head therefore comprises means for comprising differentiated action of the piston and cylinder devices depending on whether they act in the direction $f_1$, $f_2$ in which the containers bear against each other in their row or in the direction $F_1$, $F_2$ in which the rows bear against each other.

The differentiated action means consist, for example, of piston and cylinder devices 6, 7 having different forces or of reducers reducing the pressure of the fluid supplying at least one of them.

By way of variant, in FIG. 6, jaws 12, 13, 14, 15 are supported by the end of the lower leg 34 of a "C" shaped support 35 whose upper leg 36 is associated directly with the piston and cylinder device 37.

In the manner of push-rods, supports 35 of the opposite jaws may be associated with one of the opposite ends of the same piston and cylinder device 37 free to move in axial translation, which allows self centering of the jaws with respect to the layer.

However it may be, with respect to the frame, the "C" shaped supports 35 are guided in translational movement for example by means of slides or sleeves 39.

Handling of the gripping head is for example provided by a pantograph type device, whose end has been shown schematically at 38 in FIG. 6.

Advantageously, in the case where the containers are cans, there is provided under frame 1 a plate 40 (FIG. 6) made from a material which can be magnetized at will, which provides complementary holding in position of the layer, more especially after nipping, before said layer is lifted.

Of course, the present description is only given by way of indication, and other methods of implementing the process of the invention could be adopted without for all that departing from the scope and spirit thereof.

We claim:

1. A process for aligning a plurality of containers (23) in a standing position on a plane so as to occupy thereon a rectangular area, comprising movably positioning a plurality of jaws (12 to 15) to surround said containers on four sides for actuation at the level of the bodies of the containers (23), actuating the jaws (12 to 15) substantially simultaneously to cause the jaws to apply a nipping force to the layers of containers and subjecting the jaws to vibrations whereby the containers (23) are caused to line up and bear against each other and form rows of containers, said rows being offset from each other in a longitudinal direction of the layer by a distance such that in a transverse direction of the layer the containers are disposed in a staggered or quincunx arrangement.

2. Process according to claim 1, wherein the nipping force exerted by said jaws (12, 14/13, 15) is greater in one of said directions of the layer of containers (23) than the force exerted by said jaws in the other of said directions.

3. Process according to claim 2, wherein the rows are acted on in said one direction by a first force ($F_1$, $F_2$) such that the rows bear against each other, and the containers are acted on in said other direction by a second force ($f_1$, $f_2$) such that the containers bear against each other in their row, the first force ($F_1$, $F_2$) being greater than the second force ($f_1$, $f_2$).

4. A head for gripping a layer of containers (23), placed upright on a plane so as to cause said containers to occupy a rectangular area on the plane in such a way that the containers are aligned and bear against each other so as to form rows of containers and these rows are offset in a longitudinal direction from each other by a distance such that, in a transverse direction of the layer, the containers are disposed in a quincunx arrangement, comprising means for movably supporting the head for handling thereof and positioning of the head with respect to the layer of containers to be gripped, said head including a frame (1), four mobile jaws (12 to 15) associated with the frame (1), piston and cylinder means (6, 7) operably connected for actuating said jaws (12 to 15) to cause said jaws to surround the layer of containers (23) on four sides of the layer at the level of the container bodies and nip the surface of the outer containers of the layers, and vibrator means (17) operably connected for vibrating said jaws upon actuation of said vibrator means.

5. Gripping head according to claim 4, comprising means for providing differentiated action of the piston and cylinder means (6, 7) such that a first pair of said jaws applies a force ($f_1$, $f_2$) in a first direction to cause the containers (23) to bear against each other in their row and such that a second pair of said jaws applies another force ($F_1$, $F_2$) in a second direction to cause the rows to bear against each other.

6. Gripping head according to claim 5, wherein said means for providing differentiated action comprises of a first piston and cylinder means (6) for a second piston and cylinder means (7), each said piston and cylinder means (6, 7) being capable of applying forces of different magnitude.

7. Gripping head according to claim 14 wherein the piston and cylinder means (6, 7) are operably connected to the jaws (12 to 15) by push-rods (2 to 5) and links (8 to 11).

8. Gripping head according to claim 4 wherein the piston and cylinder means (6, 7) comprise "C" shaped supports (35), the supports having opposite lower legs (34), the ends of which support one set of jaws and opposite upper legs (36) which are directly associated with the piston and cylinder means (37).

9. Gripping head according to claim 8 wherein the "C" shaped supports (35) are associated with opposite ends of a piston and cylinder device (37) and free to move in axial translation, the piston and cylinder device comprising said piston and cylinder means.

10. Gripping head according to claim 4 further including a magnetizable plate (40) disposed under the frame (1) so as to provide complementary holding before lifting of the layer.

11. A head for gripping a layer of containers (23), placed upight on a plane to cause the containers to occupy a rectangular area on the plane in such a way that the containers are aligned and bear against adjacent containers, the containers being arranged in rows offset longitudinally from each other in one direction by a distance such that, in a transverse direction, the containers are disposed in a quincunx arrangement, said head comprising means (18-22) for positioning the head for handling of said containers, a frame (1), a plurality of mobile jaws (12 to 15) associated with the frame (1) by piston and cylinder means (6, 7) operably connected to said jaws for actuation thereof to form a frame member which surrounds the layer of containers (23) on four sides at the level of the container bodies and applies a nipping force to the containers and vibrator means (17) for vibrating the jaws.

12. Gripping head according to claim 11, further including means for providing differentiated action of the piston and cylinder means (6, 7) so as to cause the jaws to act with a first force ($f_1$, $f_2$) in a first direction in which the containers (23) bear against each other in their row and to act with a second force ($F_1$, $F_2$) in a second direction in which the rows bear against each other.

13. Gripping head according to claim 12, wherein the means for providing differentiated action comprises said piston and cylinder means (6, 7), and said piston and cylinder means is constructed for applying said forces with different magnitudes.

14. Gripping head according to claim 5 wherein said piston and cylinder means (6, 7) are operably connected to said jaws (2 to 15) by push-rods (2 to 5) and links (8 to 11).

15. Gripping head according to claim 12 wherein the piston and cylinder means (6, 7) comprises a piston and cylinder device (37) and wherein the frame member comprises "C" shaped supports (35), the supports having opposite lower legs (34) which support one set of jaws and opposite upper legs (36) which are directly associated with the piston and cylinder device (37).

16. Gripping head according to claim 15, wherein the "C" shaped supports (35) are associated with opposite ends of the piston and cylinder device (37) and free to move in axial translation.

* * * * *

UNITED STATES PATENT AND TRADEMARK OFFICE
CERTIFICATE OF CORRECTION

PATENT NO. : 4,603,896

DATED : August 5, 1986

INVENTOR(S) : Jackie Vasseur et al.

It is certified that error appears in the above-identified patent and that said Letters Patent is hereby corrected as shown below:

Column 4, line 64, delete "of".

Column 4, line 65, "for" should read -- and --.

Column 5, line 11, after "8" insert a comma -- , --.

Column 6, line 17, "claim 5" should read -- claim 13 --.

Column 6, line 19, "2 to 15" should read -- 12 to 15 --.

Signed and Sealed this

Twenty-fifth Day of November, 1986

Attest:

DONALD J. QUIGG

Attesting Officer

Commissioner of Patents and Trademarks